United States Patent [19]

Lorenzen

[11] Patent Number: 5,312,225
[45] Date of Patent: May 17, 1994

[54] AXIALLY THRUST-COMPENSATED TURBO MACHINE

[75] Inventor: Heinrich Lorenzen, Untersiggenthal, Switzerland

[73] Assignee: Sulzer Escher Wyss AG, Zurich, Switzerland

[21] Appl. No.: 937,730

[22] Filed: Sep. 1, 1992

[30] Foreign Application Priority Data

Sep. 4, 1991 [CH] Switzerland .................. 02595/91

[51] Int. Cl.[5] ............................................. F01D 3/02
[52] U.S. Cl. .................................. 415/105; 415/106; 415/107; 415/113; 415/118; 415/230; 277/2; 277/3; 277/65; 277/81 R
[58] Field of Search ............... 415/104, 105, 106, 107, 415/110–113, 118, 170.1, 229, 230; 277/2, 3, 65, 81 R; 310/90.5

[56] References Cited

U.S. PATENT DOCUMENTS

| 4,413,946 | 11/1983 | Marshall . | |
|---|---|---|---|
| 4,795,927 | 1/1989 | Morii et al. | 310/90.5 |
| 4,993,917 | 2/1991 | Kulle et al. | 415/107 |
| 5,028,204 | 7/1991 | Kulle et al. . | |
| 5,046,151 | 9/1991 | Yamamura | 310/90.5 |
| 5,104,284 | 4/1992 | Hustak, Jr. et al. | 415/107 |
| 5,141,389 | 8/1992 | Bear et al. | 415/107 |

FOREIGN PATENT DOCUMENTS

| 0361844 | 4/1990 | European Pat. Off. . |
| 0373817 | 6/1990 | European Pat. Off. . |
| 3925403 | 1/1991 | Fed. Rep. of Germany . |
| 449659 | 4/1968 | Switzerland . |
| 663447 | 12/1987 | Switzerland . |

Primary Examiner—Edward K. Look
Assistant Examiner—Christopher Verdier
Attorney, Agent, or Firm—Sandler Greenblum & Bernstein

[57] ABSTRACT

In a turbo machine with magnetic bearings on both sides and dry gas seals for the rotor, the axial thrust acting upon the rotor and generated by the pressure difference between the pressure side and the suction side is compensated for in that a dry gas seal provided on the suction side and the end of the shaft are acted upon by a certain pressure, which generates a compensating axial thrust, so that the resultant axial thrust becomes as slight as possible. Advantageously, this pressure is regulated via the bearing gap of an axial magnetic bearing of the rotor such that the bearing gas assumes a predetermined value.

10 Claims, 1 Drawing Sheet

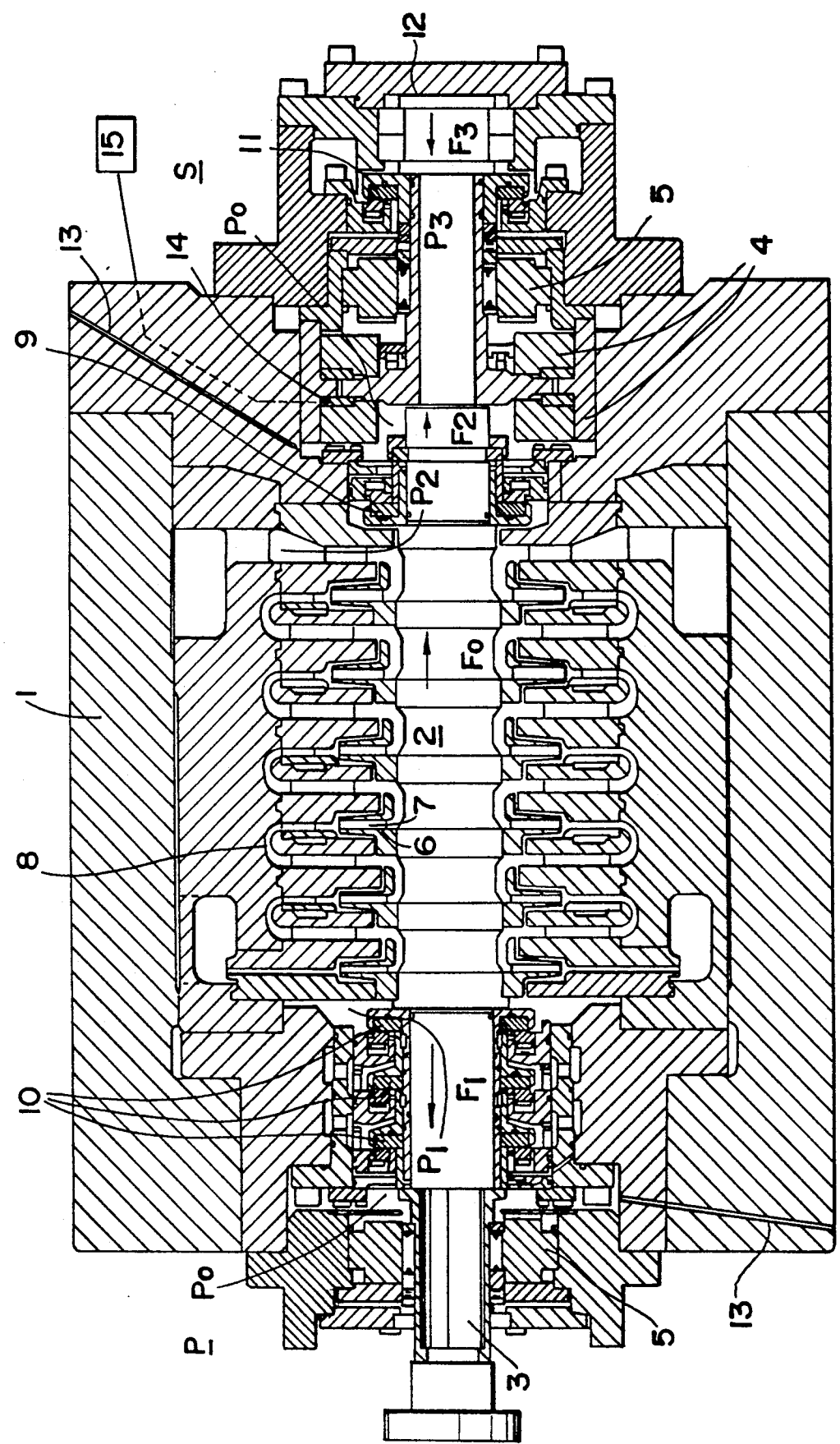

AXIALLY THRUST-COMPENSATED TURBO MACHINE

BACKGROUND OF THE INVENTION

1. Field of the Invention

The present invention relates to a turbo machine having a rotor, surrounded by a housing, with a suction side and a pressure side, and having a shaft which is supported on both ends in a housing with suitable bearings and is sealed off with seals between the interior of the housing and the surroundings, and having an arrangement for absorbing the axial thrust generated by the pressure difference between the suction side and the pressure side.

2. Description of Background and Material Information

Turbo machines of the aforementioned type are known from numerous publications, such as Swiss Patent No. 663,447, dated Dec. 15, 1987, the disclosure of which is hereby expressly incorporated by reference in its entirety, and may for instance be embodied as turbo compressors of an axial, radial or combined type, or as turbo machines of some other kind, in which a pressure difference arises between the suction side and the pressure side of the rotor.

The pressure difference between the suction side and the pressure side of the rotor creates an axial thrust. In the most favorable case, this axial thrust can be absorbed by suitable axial thrust bearings. Although numerous embodiments of such bearings are known, their load capacities are limited, especially at high rpm and for significant pressure differences.

Attempts have therefore already been made to absorb the axial thrust, or at least reduce it, by means of special arrangements. Swiss Patent No. 449,659, dated Apr. 11, 1968, describes one such arrangement, in which the axial thrust is intercepted by a co-rotating pressure comb on a secondary shaft driven with gear-wheel transmission. This requires a complicated construction requiring a significant amount of space, however.

In other arrangements, the pressure difference on the pressure side is reduced by a pressure equalization piston with a labyrinth seal. This dictates major leakage losses, however, particularly in machines having a high pressure drop and a low pumping capability.

In modern turbo machines, which use especially low-loss bearings such as magnet bearings, these provisions are often inadequate, since axial thrusts can then be absorbed only to a very limited extent, because of the low thrust capacities. From U.S. Pat. No. 5,028,204, issued on Jul. 2, 1991, and European Published Patent Application No. 373,817, a turbo machine with a magnet-supported rotor is known in which seal gas is carried to the suction-side labyrinth seal, via a pipe that is flush with the shaft and is attached to the housing, and at the same time is carried to the end face of the shaft, at reduced pressure, via a dry gas seal. By throttling the outflow of seal gas, the force of the thrust on the end face can be adjusted and the axial thrust can be compensated for. Supporting the shaft on the suction side is impossible here, so that the turbo machine is embodied in an overhanging fashion. In heavy weight machines with a number of stages and a correspondingly long length, this feature is unusable, because of the lack of rotor stability. Furthermore, the labyrinth seal used does not allow a major pressure difference, or else causes undesired leakage losses.

SUMMARY OF THE INVENTION

Therefore, with the foregoing in mind, it is a primary object of the present invention to provide an improved turbo machine that is not afflicted with the aforementioned limitations and disadvantages of the prior art.

Another and more specific object of the present invention is the provision of a turbo machine with a rotor supported on both sides with magnet bearings, to eliminate the axial thrust that occurs at the rotor because of the pressure difference between the suction and pressure sides, as much as possible without having disruptive leakage losses, especially in machines with a high pressure drop, high rpm and a long structural length with a corresponding considerable weight.

According to the present invention, the aforementioned object is attained in that the seals of the shaft on the suction side and the pressure side are embodied as dry gas seals, which act outwardly, each against a respective suction-side and pressure-side bearing chamber of the radial thrust shaft bearings embodied as magnetic bearings; and that on the suction-side end of the shaft of the turbo machine, a further dry gas seal is provided, which together with part of the end face of the shaft is acted upon by a seal gas pressure, such that over the impingement face, an axial force is formed which at least largely compensates for the axial force caused by the pressure difference and acting upon the rotor.

It is advantageous for the pressure that acts upon the impingement face to be regulated, by axial thrust measurement or gap measurement in the magnetic axial thrust bearing and by a corresponding closed-loop control circuit, such that the axial thrust is kept to a predetermined value. The closed-loop control, that is, the regulation, may be done such that the remaining axial thrust virtually vanishes, or does not exceed a predetermined threshold.

It is especially advantageous to provide the magnetic bearings with a measuring instrument for determining the bearing gap; the closed-loop control arrangement may be embodied such that this bearing gap is regulated to a predetermined value, via the seal gas pressure of the further dry gas seal.

The invention is described in further detail below in terms of an exemplary embodiment of the invention, shown in the drawing.

BRIEF DESCRIPTION OF THE DRAWING

The above and additional objects, characteristics, and advantages of the present invention will become apparent in the following detailed description of a preferred embodiment, with reference to the accompanying drawing which is presented as a non-limiting example, in which the single FIGURE is an axial section through a six-stage radial compressor. However, it should be noted that the invention can be applied analogously to other turbo machines, with similar advantages.

DETAILED DESCRIPTION OF A PREFERRED EMBODIMENT

With respect to the drawing, only enough of the construction of the invention has been depicted, to simplify the illustration, as needed for those of ordinary skill in the art to readily understand the underlying principles of the invention and, therefore, to permit them to make and use the invention.

In the turbo compressor reproduced in the drawing, a rotor 2 is disposed in a housing 1 and has a shaft 3, which is supported in the housing 1 on both the suction side S and the pressure side P in a low-loss manner with radial magnet bearings 5 and an axial magnet bearing 4. The shaft 3 has six impeller wheels 6 in axial succession, with impeller blades 7 that transport the pumped medium, such as the gas to be compressed, radially outwardly, where it is rerouted to the next stage through diffusers 8 in the housing. On the suction side S, the shaft 3 is sealed off from the interior of the bearing chamber of the housing 1 by means of a dry gas seal 9. Analogously, the shaft 3 is likewise sealed off from the other bearing chamber of the housing 1 on the pressure side P of the turbo machine by dry gas seals 10. Because of the high pressure on the pressure side P, it is recommended that a multiple seal, such as a triple dry gas seal, be used on the pressure side. For the construction of such seals, German Published Patent Application No. 3,925,403, published on Jan. 24, 1991, for instance, the disclosure of which is hereby expressly incorporated by reference in its entirety, and other publications may be referred to. As a rule, these seals operate between the internal pressure $p_1$ in the housing on the pressure side, or the suction-side pressure $p_2$, and the pressure $p_0$ in the bearing chamber, which via a bore 13 communicates with a lower defined pressure, and they have a stationary slide ring which is pressed by seal gas against a co-rotating sealing ring, forming a gap for contactless sealing with minimum leakage.

Because of the pressure difference between the suction and the pressure sides of the turbo machine, an axial thrust $F_0$ is generated, as well as different axial thrusts $F_1$ and $F_2$ at the two dry gas seals 9 and 10, of which the resultant axial thrust $(F_0-F_1+F_2)$ is oriented in the axial direction toward the suction side S and exerts an axial thrust upon the shaft bearings 4 and 5, embodied here as magnetic bearings. This axial thrust cannot be allowed, especially with magnetic bearings and with machines having a high pressure differential and high rpm, or speed of rotation. To eliminate this axial thrust, or at least to reduce it to a harmless value, an additional dry gas seal 11 is provided on the suction side S of the rotor, at the face end 12 of the shaft 3, specifically conversely to the dry gas seal 9, in such a manner that on the inside it counteracts the internal pressure $p_0$ in the bearing chamber, while on the outside it is acted upon by an increased pressure $p_3$. That pressure acts upon the additional dry gas seal 11 and simultaneously on the surfaces of end 12 of the shaft 3 and generates a counter thrust $F_3$. By thrust measurement or by other measurement of some physical parameter, for instance, the counter thrust $F_3$ is advantageously regulated such that it compensates for the resultant axial thrust $(F_0-F_1+F_2)$, or at least reduces it to a value that is allowable for the magnetic bearings.

Using dry gas seals allows losses to be kept especially low, even at relatively high pressure drops. The use of magnetic bearings on both the suction side and the pressure side permits low-loss support of even heavy weight machines with a number of stages at high rpm.

It is especially advantageous to provide a gap measuring instrument 14, for instance on the axial magnet bearing 4 or on some other bearing, which via appropriate control, such as a closed-loop control circuit 15, regulates the impingement pressure $p_3$ on the end face 12 of the shaft 3 in such a way that the gap width of the magnet bearing remains within the specified tolerances.

In this way, the advantages of low-loss shaft bearings can be fully exploited, especially at the high rpm of the turbo machine and at high pressure differentials, without disruptive leakage occurring and without requiring complicated compensation arrangements.

This application is based upon Swiss Application No. 02 595/91-4, which was filed on Sep. 4, 1991, the priority of which is claimed.

Finally, although the invention has been described with reference of particular means, materials and embodiments, it is to be understood that the invention is not limited to the particulars disclosed and extends to all equivalents within the scope of the claims.

What is claimed is:

1. A turbo machine comprising:
    a rotor comprising a shaft having a suction side and a pressure side;
    a housing extending around said rotor along at least a portion of the length of said rotor;
    first and second magnetic bearings mounted at said housing and supporting opposite respective axial portions of said shaft, said first and second magnetic bearings having respective bearing chambers with interiors;
    a third magnetic bearing mounted at said housing, adjacent said first magnetic bearing, between said first and second magnetic bearings, for supporting said shaft against axial force;
    seals for sealing said shaft from the interiors of said bearing chambers of said housing at said suction side and at said pressure side, comprising an arrangement for absorbing an initially produced axial force generated by a pressure difference between the suction side and the pressure side acting upon said rotor;
    said seals comprise first and second dry gas seals, which act outwardly, each against said respective suction side and pressure side bearing chambers of said first and second magnetic bearings, respectively;
    a further dry gas seal provided on an end of said shaft at said suction side of said housing and acting inversely relative to said first dry gas seal, wherein said further dry gas seal and at least a portion of said end of said shaft are acted upon by a seal gas pressure such that over an impingement face of said shaft end, a compensating axial force is generated which at least substantially compensates for said initially produced axial force generated by the pressure difference between the suction side and the pressure side acting upon said rotor.

2. A turbo machine according to claim 1, further comprising:
    a closed-loop control circuit for measuring said initially produced axial force and controlling said seal gas pressure for regulating to a predetermined value said compensating axial force.

3. A turbo machine according to claim 2, wherein:
    said closed-loop control circuit comprises means for regulating a resultant axial thrust resulting from said compensating axial force and said initially produced axial force, so that said resultant axial force does not exceed a predetermined threshold value.

4. A turbo machine according to claim 1, further comprising:

a measuring instrument for measuring a magnetic bearing gap of the third one of said magnetic bearings; and a closed-loop control circuit connected to said measuring instrument for regulating said magnetic bearing gap at a predetermined value via said seal gas pressure.

5. A turbo machine comprising:

a rotor comprising a shaft;

a housing extending around said rotor along at least a portion of the length of said rotor, said housing having an interior, a suction side and a pressure side;

bearings mounted at said housing and supporting opposite axial portions of said shaft;

first and second seals for sealing said shaft from the interior of said housing at said suction side and at said pressure side, respectively, said seals acting outwardly, each against said respective suction side and pressure side, said seals comprising an arrangement for absorbing an initially produced axial force acting upon said rotor generated by a pressure differential among axial forces acting on said shaft;

an additional seal provided on said shaft, between said first and second seals and acting conversely to that of said first seal, wherein a force acts upon said additional seal so that a compensating axial force is generated which at least substantially compensates for said initially produced axial force.

6. A turbo machine according to claim 5, wherein:
said bearings are magnetic bearings.

7. A turbo machine according to claim 5, further comprising:

a control circuit for measuring said initially produced axial force and controlling said compensating axial force for regulating to a predetermined value said compensating axial force.

8. A turbo machine according to claim 7, wherein:
said control circuit comprises means for regulating a resultant axial thrust resulting from said compensating axial force and said initially produced axial force, so that said resultant axial force does not exceed a predetermined threshold value.

9. A turbo machine according to claim 5, further comprising:

a measuring instrument for measuring a physical parameter of at least one of said bearings; and a control circuit connected to said measuring instrument for regulating said physical parameter to be maintained substantially at a predetermined value.

10. A turbo machine according to claim 9, wherein:
said physical parameter comprises a bearing gap.

* * * * *